(12) United States Patent
Lee (10) Patent No.: US 12,086,423 B1
(45) Date of Patent: Sep. 10, 2024

(54) MEMORY FOR PERFORMING COUNTING OPERATION, MEMORY SYSTEM, AND OPERATION METHOD OF MEMORY

(71) Applicant: SK hynix Inc., Gyeonggi-do (KR)

(72) Inventor: Jeong Jun Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/347,580

(22) Filed: Jul. 6, 2023

(30) Foreign Application Priority Data

Mar. 24, 2023 (KR) .......................... 10-2023-0038400

(51) Int. Cl.
*G06F 3/06* (2006.01)
*G06F 21/56* (2013.01)

(52) U.S. Cl.
CPC .......... *G06F 3/0619* (2013.01); *G06F 3/0659* (2013.01); *G06F 3/0673* (2013.01); *G06F 21/566* (2013.01); *G06F 2221/034* (2013.01)

(58) Field of Classification Search
None
See application file for complete search history.

(56) References Cited

U.S. PATENT DOCUMENTS

| 2016/0163377 | A1* | 6/2016 | Oh ..................... G11C 11/40615 365/222 |
| 2021/0151095 | A1 | 5/2021 | Nale et al. |
| 2023/0420033 | A1* | 12/2023 | Kim ..................... G11C 7/1063 |

FOREIGN PATENT DOCUMENTS

KR 10-2015-0085485 A 7/2015

* cited by examiner

*Primary Examiner* — Brian R Peugh
(74) *Attorney, Agent, or Firm* — IP & T GROUP LLP (57) ABSTRACT

An operation method of memory may include activating a first row that is selected in a first bank, activating a second row that is selected in a second bank, receiving an all-bank counting command, reading a first access count from memory cells of specific columns of the first row in response to the all-bank counting command, increasing the first access count, writing the increased first access count in the memory cells of the specific columns of the first row, reading a second access count from memory cells of specific columns of the second row in response to the all-bank counting command, increasing the second access count, and writing the increased second access count in the memory cells of the specific columns of the second row.

20 Claims, 6 Drawing Sheets

MEMORY FOR PERFORMING COUNTING OPERATION, MEMORY SYSTEM, AND OPERATION METHOD OF MEMORY

CROSS-REFERENCE TO RELATED APPLICATION

This application claims priority under 35 U.S.C. § 119 to Korean Patent Application No. 10-2023-0038400 filed on Mar. 24, 2023, which is incorporated herein by reference in its entirety.

BACKGROUND

1. Technical Field

Various embodiments of the present disclosure relate to a memory and a memory system including the same.

2. Related Art

As the degree of integration of memory is increased, an interval between multiple word lines that are included in memory is reduced. As the interval between the word lines is reduced, a coupling effect between adjacent word lines is increased.

A word line is toggled between an activation (or active) state and a deactivation state whenever data is input to and output from a memory cell. As the coupling effect between adjacent word lines is increased as described above, data of a memory cell connected to a word line adjacent to a word line that is frequently activated is damaged. Such a phenomenon is called row hammering or word line disturbance. A phenomenon in which data stored in a memory cell is damaged before the memory cell is refreshed due to word line disturbance becomes a concern.

Figure 1:
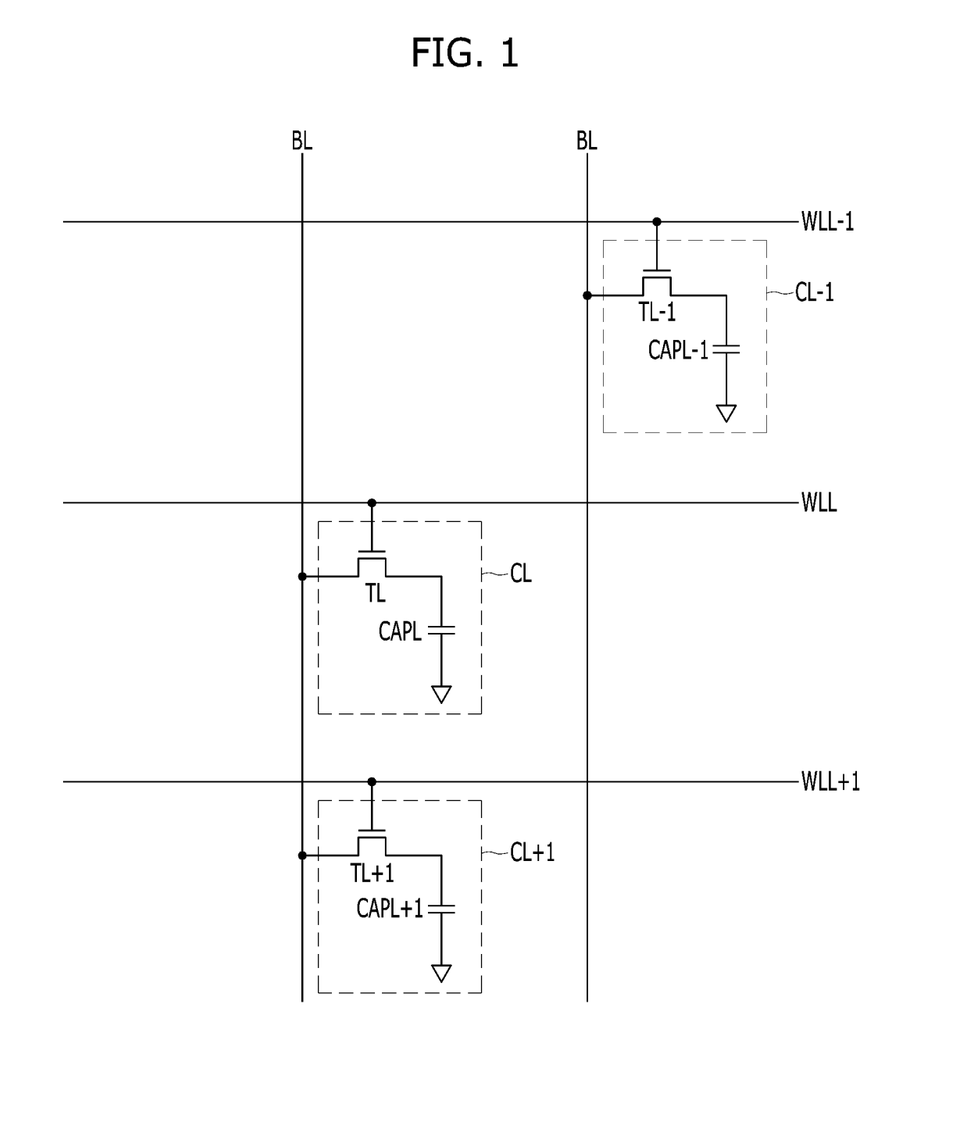
FIG. 1 is a diagram for describing row hammering.

FIG. 1 is a diagram for describing row hammering, and illustrates a part of a cell array that is included in memory.

In FIG. 1, a word line WLL corresponds to a word line having a high activation count. Each of the word lines WLL−1 and WLL+1 corresponds to a word line that is disposed to be adjacent to the word line WLL, that is, a word line close to the word line having the high activation count. Furthermore, a memory cell CL indicates a memory cell that is connected to the word line WLL. A memory cell CL−1 indicates a memory cell that is connected to the word line WLL−1. A memory cell CL+1 indicates a memory cell that is connected to the word line WLL+1. The memory cells include cell transistors TL, TL−1, and TL+1 and cell capacitors CAPL, CAPL−1, and CAPL+1, respectively.

In FIG. 1, when the word line WLL is activated or deactivated, voltages of the word line WLL−1 and the word line WLL+1 rise or drop due to coupling phenomena occurring between the word line WLL and the word line WLL−1 and between the word line WLL and the word line WLL+1, so that the amounts of charges of the cell capacitors CAPL−1 and CAPL+1 are also affected. Accordingly, if the word line WLL is toggled between the activation state and the deactivation state as the word line WLL is frequently activated, a change in the amount of charges that are stored in each of the cell capacitors CAPL−1 and CAPL+1 included in the memory cell CL−1 and the memory cell CL+1 may be increased, and data of the memory cells CL−1 and CL+1 may be deteriorated.

Furthermore, electromagnetic waves that are generated as a word line is toggled between the activation state and the deactivation state damages data by enabling electrons to be introduced into the cell capacitor of a memory cell that is connected to a word line adjacent to the toggled word line or draining electrons from the cell capacitor of a memory cell that is connected to a word line adjacent to the toggled word line.

As a method for addressing row hammering, a method of finding a row that has been activated several times and refreshing rows adjacent to the row that has been activated several times is chiefly used.

SUMMARY

In an embodiment of the present disclosure, an operation method of memory may include activating a first row that is selected in a first bank; activating a second row that is selected in a second bank; receiving an all-bank counting command; reading a first access count from memory cells of specific columns of the first row in response to the all-bank counting command; increasing the first access count; writing the increased first access count in the memory cells of the specific columns of the first row; reading a second access count from memory cells of specific columns of the second row in response to the all-bank counting command; increasing the second access count; and writing the increased second access count in the memory cells of the specific columns of the second row.

In an embodiment of the present disclosure, an operation method of memory may include activating a first row that is selected in a first bank; activating a second row that is selected in a second bank; activating a third row that is selected in a third bank; receiving a multi-bank counting command, a bank address for selecting the second bank, and a bank address for selecting the third bank; reading a first access count from memory cells of specific columns of the second row, in response to the multi-bank counting command and the bank address for selecting the second bank; increasing the first access count; writing the increased first access count in the memory cells of the specific columns of the second row; reading a second access count from memory cells of specific columns of the third row, in response to the multi-bank counting command and the bank address for selecting the third bank; increasing the second access count; and writing the increased second access count in the memory cells of the specific columns of the third row.

In an embodiment of the present disclosure, memory may include multiple memory banks each comprising memory cells that are arranged in multiple rows and multiple columns; and access operation circuits provided in the respective memory banks, and each configured to update, in response to an all-bank counting command directed to activated memory banks among the multiple memory banks, an access count for an activated row of a corresponding memory bank.

In an embodiment of the present disclosure, memory may include multiple memory banks each comprising memory cells that are arranged in multiple rows and multiple columns; and access operation circuits provided in the respective memory banks, and each configured to update, in response to a multi-bank counting command directed to two or more memory banks selected from the multiple memory banks, an access count for an activated row of a corresponding bank of the selected memory banks.

In an embodiment of the present disclosure, a memory system may include a memory controller configured to indicate an active operation and an all-bank counting operation; and a memory comprising multiple memory banks that are activated by the indication of the active operation and configured to perform, in response to the indication of the all-bank counting operation directed to activated memory banks among the multiple memory banks, an operation of updating an access count of an activated row of each of the activated memory banks.

In an embodiment of the present disclosure, a memory system may include a memory controller configured to indicate an active operation and a multi-bank counting operation; and a memory comprising multiple memory banks that are activated by the indication of the active operation and configured to perform, in response to the indication of the multi-bank counting command directed to two or more memory banks selected from the multiple memory banks, an operation of updating an access count of an activated row of each of the selected memory banks.

In an embodiment of the present disclosure, an operation method of memory may include activating first to third rows selected respectively from first to third arrays of memory cells; and increasing, in response to a single counting command, a value of data stored in one or more memory cells selected from the first row and a value of data stored in one or more memory cells selected from the second row.

DETAILED DESCRIPTION

Hereinafter, embodiments according to the technical spirit of the present disclosure are described with reference to the accompanying drawings.

Embodiments of the present disclosure may provide a technology for increasing the memory's ability to handle row hammering.

Figure 2:
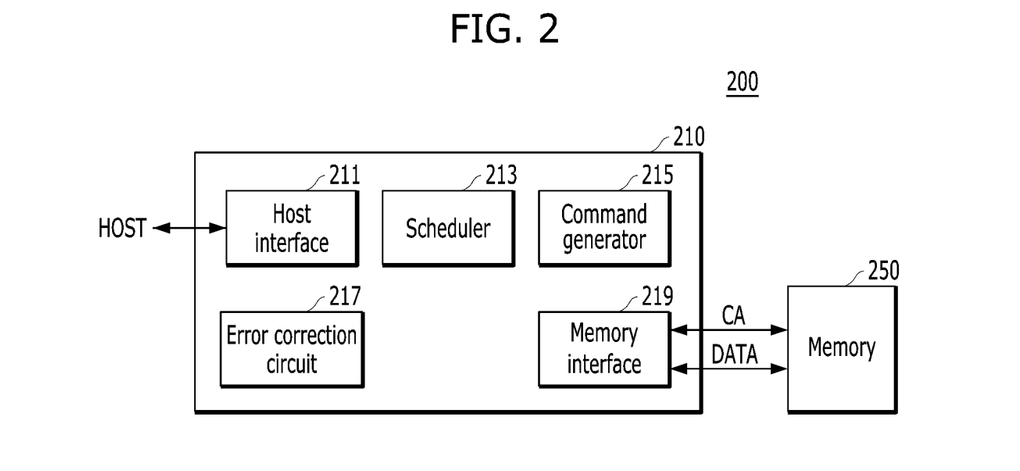
FIG. 2 is a configuration diagram of a memory system according to an embodiment of the present disclosure.

FIG. 2 is a configuration diagram of a memory system 200 according to an embodiment of the present disclosure.

Referring to FIG. 2, the memory system 200 may include a memory controller 210 and a memory 250.

The memory controller 210 may control an operation of the memory 250 in response to a request from a host HOST. The host may include a central processing unit (CPU), a graphic processing unit (GPU), or an application processor (AP). The memory controller 210 may include a host interface 211, a scheduler 213, a command generator 215, an error correction circuit 217, and a memory interface 219. The memory controller 210 may be included in a processor, such as a CPU, a GPU, or an AP. In this case, the host may mean a component except the memory controller 210, among the internal components of the processor. For example, if the memory controller 210 is included in a CPU, in FIG. 2, the host may indicate the remaining components except the memory controller 210 in the CPU.

The host interface 211 may be for an interface between the memory controller 210 and the host.

The scheduler 213 may determine the sequence of requests to be indicated for the memory 250 among requests from the host. The scheduler 213 may arrange, despite the reception order of the requests from the host, the sequence of requests in order to improve performance of the memory 250. For example, although the host first requests a read operation of the memory 250 and then requests a write operation of the memory 250, the scheduler 213 may adjust the sequence of the write operation and the read operation so that the write operation is performed earlier than the read operation.

In an embodiment, the memory 250 may perform a counting operation of counting the access count of rows for each memory bank of the memory 250 by the indication of the memory controller 210. The scheduler 213 may schedule the counting operation of the memory 250 every active operation of the memory 250. That is, when one row is activated, the scheduler 213 may schedule one counting operation until the activated row is precharged. For example, the scheduler 213 may schedule a $3^{rd}$ row active operation for a memory bank0→a read operation for the memory bank0→a write operation for the memory bank0→a counting operation for the memory bank0→a $3^{rd}$ row precharge operation for the memory bank0→a $100^{th}$ row active operation for a memory bank1→a counting operation for the memory bank1→a read operation for the memory bank1→a $100^{th}$ row precharge operation for the memory bank1→a $53^{rd}$ row active operation for the memory bank1→a read operation for the memory bank1→a read operation for the memory bank1-a counting operation for the memory bank1→a write operation for the memory bank1→a $53^{rd}$ row precharge operation for the memory bank1. According to the example, it may be seen that the scheduler 213 schedules one counting operation in an interval between the active operation and the precharge operation for one row. The memory controller 210 may indicate a counting operation for one memory bank of the memory 250, but may indicate counting operations for a plurality of memory banks of the memory 250 at once.

The command generator 215 may generate a command to be applied to the memory 250, according to the sequence of operations that are determined by the scheduler 213.

The error correction circuit 217 may detect and correct an error in data that has been read from the memory 250. After the start of a write operation of the memory 250, the error correction circuit 217 may generate an error correction code (ECC) by using data to be written in the memory 250. The ECC that is generated by the error correction circuit 217 may be stored in the memory 250 along with the write data. After the start of a read operation of the memory 250, the error correction circuit 217 may detect an error in data that has been read from the memory 250 by using an ECC that has been read from the memory 250, and may correct an error when the error is detected. In FIG. 2, data DATA that are transmitted and received between the memory controller 210 and the memory 250 may include raw data and an ECC.

The memory interface 219 may be for an interface between the memory controller 210 and the memory 250. A command and an address CA may be transferred from the memory controller 210 to the memory 250 through the memory interface 219. The data DATA may be transmitted and received through the memory interface 219. The memory interface 219 may also be called a PHY interface.

The memory 250 may perform an operation that is indicated by the memory controller 210. The memory 250 may be memory that requires a refresh operation. For example, the memory 250 may be DRAM, and may be a different type of memory that requires a refresh operation. The memory 250 may perform an active operation, a precharge operation, a read operation, a write operation, a refresh operation, and a counting operation by the indication of the memory controller 210.

Figure 3:
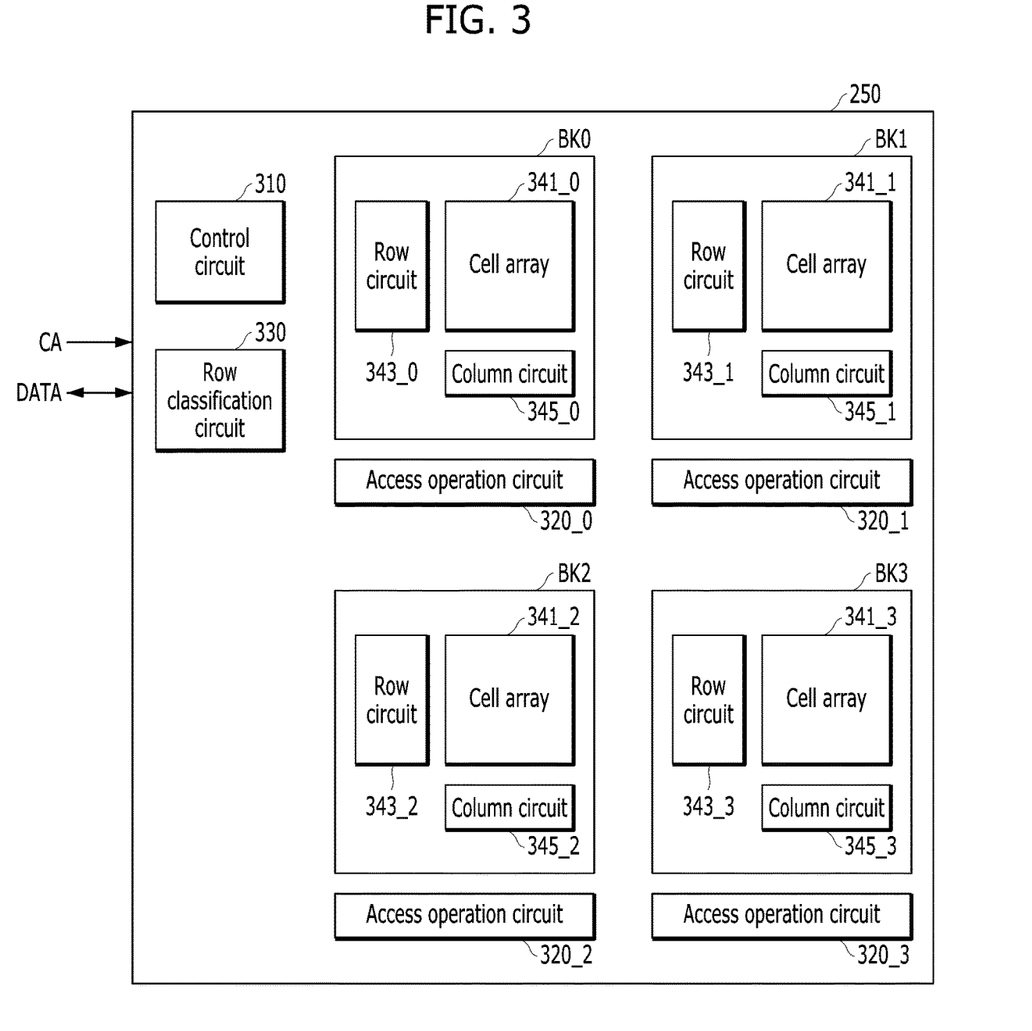
FIG. 3 is a configuration diagram of a memory shown in FIG. 2 according to an embodiment of the present disclosure.

FIG. 3 is a configuration diagram of the memory 250 shown in FIG. 2 according to an embodiment the present disclosure.

Referring to FIG. 3, the memory 250 may include a control circuit 310, memory banks BK0 to BK3, access operation circuits 320_0 to 320_3, and a row classification circuit 330.

The control circuit 310 may control an overall operation of the memory 250. The control circuit 310 may control internal components of the memory 250 so that the memory 250 can perform operations that are indicated by a command and the address CA. The operations that are performed by the memory 250 may include an active operation, a precharge operation, a read operation, a write operation, a refresh operation, and a counting operation.

The memory banks BK0 to BK3 may include cell arrays 341_0 to 341_3, row circuits 343_0 to 343_3, and column circuits 345_0 to 345_3, respectively. In this case, the memory 250 has been illustrated as including the four memory banks BK0 to BK3, but the memory 250 may include various numbers of memory banks, such as 16 and 32.

Each of the cell arrays 341_0 to 341_3 may include multiple memory cells that are arranged in multiple rows and multiple columns. In each of the rows, memory cells of N specific columns may be used to store the access count of the row. If the total number of columns is M in a cell array, memory cells of M−N columns in each row may be used to store data and memory cells of remaining N columns may be used to store the access count of the row. For example, memory cells of first to (M−N)-th columns in a first row of each of the cell arrays 341_0 to 341_3 may be used to store data, and memory cells of (M−N+1)-th to M-th columns in the first row may be used to store the access count of the first row. Likewise, memory cells of first to (M−N)-th columns in a $103^{rd}$ row of each of the cell arrays 341_0 to 341_3 may be used to store data, and memory cells of (M−N+1)-th to M-th columns in the $103^{rd}$ row may be used to store the access count of the $103^{rd}$ row. In general, the number of columns per row is tens of thousands or more. In order to record the access count of a corresponding row, about several tens of bits (e.g., 16 bits) may be required. Accordingly, tens of thousands of memory cells or more in one row may be used to store data, and only several tens of memory cells may be used to store the access count of a corresponding row. In this case, memory cells of (M−N+1)-th to M-th columns in each row have been illustrated as being used to store the access count of a corresponding row. However, locations of memory cells that are used to store the access count may be different from the locations indicated above.

The row circuits 343_0 to 343_3 may perform an active operation of activating a row that is selected by a row address, among multiple rows of the cell arrays 341_0 to 341_3. For example, the row circuit 343_0 may activate a row of the cell array 341_0, which is selected by a row address, after the start of an active operation for the memory bank BK0. The row circuit 343_3 may activate a row of the cell array 341_3, which is selected by a row address, after the start of an active operation for the memory bank BK3. Data of memory cells of the selected row during the active operation may be sensed and amplified. Furthermore, the row circuits 343_0 to 343_3 may refresh memory cells of a row that has been selected so that a refresh operation is performed on the row.

Each of the column circuits 345_0 to 345_3 may write data into memory cells of columns that are selected by a column address, among columns of a row that belongs to each of the cell arrays 341_0 to 341_3 and that is selected by each of the row circuits 343_0 to 343_3, or may read data from memory cells of selected columns of each of the cell arrays 341_0 to 341_3. That is, each of the column circuits 345_0 to 345_3 may perform an operation of reading data from or writing data into memory cells corresponding to a selected row and selected columns in each of the cell arrays 341_0 to 341_3. For example, the column circuit 345_1 may write data into or read data from memory cells of columns that are selected by a column address in a row that is selected by the row circuit 343_1 in the cell array 341_1. After the start of a counting operation, each of the column circuits 345_0 to 345_3 may read an access count from memory cells of specific columns for storing the access count, may transfer the access count to each of the access operation circuits 320_0 to 320_3, and may write, into the memory cells of the specific columns again, an access count that has been updated by each of the access operation circuits 320_0 to 320_3.

The access operation circuits 320_0 to 320_3 may be provided in the respective memory banks BK0 to BK3 and each of the access operation circuits 320_0 to 320_3 may be used to update an access count for each row of a corresponding one of the memory banks BK0 to BK3. In this case, the access count may mean the number of active operations. Each of the access operation circuits 320_0 to 320_3 may update an access count that is transferred by each of the column circuits 345_0 to 345_3 by increasing the access count and may transfer the updated access count back to each of the column circuits 345_0 to 345_3. For example, when an access count "1067" for a $6^{th}$ row of the cell array 341_3 is received from the column circuit 345_3, the access operation circuit 320_3 may update the access count "1067" into an access count "1068" and may transfer the access count "1068" back to the column circuit 345_3.

The row classification circuit 330 may check whether an access count that has been updated by the access operation circuits 320_0 to 320_3 is equal to or greater than a threshold. When the updated access count is equal to or greater than the threshold, the row classification circuit 330 may classify, as refresh-target rows that need to be refreshed, adjacent rows of the row having the access count equal to or greater than the threshold and may store the information of the refresh-target rows. For example, when the access count of an $8^{th}$ row of the memory bank BK1, which has been updated by the access operation circuit 320_1, is equal to or greater than the threshold "10000", the row classification circuit 330 may classify, as the refresh-target rows, $7^{th}$ row and $9^{th}$ row of the memory bank BK1, that is, adjacent rows of the $8^{th}$ row of the memory bank BK1 and may store the information of the $7^{th}$ and $9^{th}$ rows.

Various types of operations of the memory 250 are described.

Active Operation

An active operation may be started by applying to the memory 250, by the memory controller 210, an active command, a bank address for selecting a memory bank on which the active operation will be performed, and a row address for selecting a row to be activated within the selected memory bank. For example, when an active command, a bank address to designate the memory bank BK2, and a row address to designate a $100^{th}$ row of the memory bank BK2 are applied to the memory 250, the row circuit 343_2 of the memory bank BK2 may select and activate the $100^{th}$ row of the cell array 341_2. Data of memory cells of a selected row of the selected memory bank during an active operation may be detected and amplified.

An operation of terminating an active operation is called a precharge operation. The active operation may be terminated by applying to the memory 250, by the memory controller 210, a precharge command and a bank address. For example, when a precharge command and a bank address for selecting a memory bank BK3 are applied to the memory 250 in the state in which a $3^{rd}$ row of the memory bank BK3 has been activated, the $3^{rd}$ row of the memory bank BK3 may be precharged.

Write Operation

A write operation may be performed during an active operation. For example, if the memory banks BK1 and BK2 have been activated in the memory 250, a write operation may be performed on the memory banks BK1 and BK2, but a write operation might not be performed on the memory banks BK0 and BK3. A write operation may be started by applying to the memory 250, by the memory controller 210, a write command, a bank address for selecting a memory bank on which the write operation will be performed, and a column address for selecting columns to be written within the selected memory bank. Furthermore, after the start of the write operation, write data may be transferred from the memory controller 210 to the memory 250. For example, when a write command, a bank address to designate the memory bank BK1, a column address, and write data are applied to the memory 250 in the state in which a $10^{th}$ row of the memory bank BK1 has been activated, the column circuit 345_1 of the memory bank BK1 may write the write data into memory cells that are selected by the column address in the $10^{th}$ row of the cell array 341_1. That is, the write operation may be performed on an activated bank. The write data may be written into memory cells of columns that are selected after the start of the write operation in a row selected after the start of an active operation.

Read Operation

A read operation may be performed during an active operation. For example, if the memory banks BK0 and BK1 have been activated in the memory 250, a read operation may be performed on the memory banks BK0 and BK1, but a read operation might not be performed on the memory banks BK2 and BK3. A read operation may be started by applying to the memory 250, by the memory controller 210, a read command, a bank address for selecting a memory bank on which the read operation will be performed, and a column address for selecting columns to be read within the selected memory bank. Furthermore, after the start of a read operation, read data may be transferred from the memory 250 to the memory controller 210. For example, when a read command, a bank address to designate the memory bank BK2, and a column address are applied to the memory 250 in the state in which a $43^{rd}$ row of the memory bank BK2 has been activated, the column circuit 345_2 of the memory bank BK2 may read data from memory cells that are selected by the column address in the $43^{rd}$ row of the cell array 341_2. Furthermore, the read data may be transferred from the memory 250 to the memory controller 210.

Counting Operation

A counting operation is an operation of counting the access count, that is, an active count of a row on which an active operation is being now performed. Therefore, the counting operation may be performed during the active operation. For example, if the memory banks BK0, BK1, and BK3 have been activated in the memory 250, a counting operation may be performed on the memory banks BK0, BK1, and BK3, but a counting operation might not be performed on the memory bank BK2. The counting operation may be started by applying, by the memory controller 210, a counting command to the memory 250. The type of counting command may include the following three types (1), (2), and (3).

(1) Normal Counting Command

A normal counting command may be a command for indicating a normal counting operation for one memory bank. The normal counting command may be applied from the memory controller 210 to the memory 250, along with a bank address for selecting a memory bank on which the normal counting operation will be performed. When a normal counting command and a bank address for selecting the memory bank BK1 are applied to the memory 250 in the state in which a $234^{th}$ row of the memory bank BK0 has been activated and a $46^{th}$ row of the memory bank BK1 has been activated, a normal counting operation may be performed on the memory bank BK1. The column circuit 345_1 of the memory bank BK1 may read the access count of the $46^{th}$ row from memory cells of specific columns of the $46^{th}$ row of the cell array 341_1, and may transfer the read access count to the access operation circuit 320_1. The access operation circuit 320_1 may update the received access count by +1 and may then transfer the updated access count back to the column circuit 345_1. Furthermore, the column circuit 345_1 may write the updated access count into the memory cells of the specific columns of the $46^{th}$ row.

(2) All-Bank Counting Command

An all-bank counting command may be a command for indicating an all-bank counting operation for multiple memory banks. When the all-bank counting command is applied to the memory 250, an all-bank counting operation may be performed on all activated memory banks of the memory 250. When the all-bank counting command is applied to the memory 250 in the state in which a $3^{rd}$ row of the memory bank BK0 has been activated, a $13^{th}$ row of the memory bank BK2 has been activated, and a $76^{th}$ row of the memory bank BK3 has been activated, an all-bank counting operation may be performed on the memory banks BK0, BK2, and BK3. The column circuit 345_0 of the memory bank BK0 may read the access count of the $3^{rd}$ row from memory cells of specific columns of the $3^{rd}$ row of the cell array 341_0, and may transfer the read access count to the access operation circuit 320_0. The access operation circuit 320_0 may update the received access count by +1 and may transfer the updated access count back to the column circuit 345_0. Furthermore, the column circuit 345_0 may write the updated access count into the memory cells of the specific columns of the $3^{rd}$ row. The column circuit 345_2 of the memory bank BK2 may read the access count of the $13^{th}$ row from memory cells of specific columns of the $13^{th}$ row of the cell array 341_2 and may transfer the read access count to the access operation circuit 320_2. The access operation circuit 320_2 may update the received access count by +1, and may then transfer the updated access count back to the column circuit 345_2. Furthermore, the column circuit 345_2 may write the updated access count into the memory cells of the specific columns of the $13^{th}$ row. The column circuit 345_3 of the memory bank BK3 may read the access count of the $76^{th}$ row from memory cells of specific columns of the $76^{th}$ row of the cell array 341_3 and may transfer the read access count to the access operation circuit 320_3. The access operation circuit 320_3 may update the received access count by +1 and may then transfer the updated access count back to the column circuit 345_3. Furthermore, the column circuit 345_3 may write the updated access count into the memory cells of the specific columns of the 76$^{th}$ row.

(3) Multi-Bank Counting Command

A multi-bank counting command may be a command for indicating a multi-bank counting operation for multiple memory banks. The all-bank counting command may be a command for indicating a counting operation for all activated memory banks of the memory 250. In contrast, the multi-bank counting command may be a command for indicating a counting operation for selected memory banks, among activated memory banks of the memory 250. The multi-bank counting command may be applied along with two or more bank addresses. When a multi-bank counting command, a bank address for selecting the memory bank BK2, and a bank address for selecting the memory bank BK3 are applied in the state in which a 7$^{th}$ row of the memory bank BK0 has been activated, a 83$^{rd}$ row of the memory bank BK1 has been activated, a 98$^{th}$ row of the memory bank BK2 has been activated, and a 35$^{th}$ row of the memory bank BK3 has been activated, a counting operation may be performed on the memory banks BK2 and BK3. The column circuit 345_2 of the memory bank BK2 may read the access count of the 98$^{th}$ row from memory cells of specific columns of the 98$^{th}$ row of the cell array 341_2 and may transfer the read access count to the access operation circuit 320_2. The access operation circuit 320_2 may update the received access count by +1 and may then transfer the updated access count back to the column circuit 345_2. Furthermore, the column circuit 345_2 may write the updated access count into the memory cells of the specific columns of the 98$^{th}$ row. The column circuit 345_3 of the memory bank BK3 may read the access count of the 35$^{th}$ row from memory cells of specific columns of the 35$^{th}$ row of the cell array 341_3 and may transfer the read access count to the access operation circuit 320_3. The access operation circuit 320_3 may update the received access count by +1 and may then transfer the updated access count back to the column circuit 345_3. Furthermore, the column circuit 345_3 may write the updated access count into the memory cells of the specific columns of the 35$^{th}$ row.

Refresh Operation

A refresh operation may be started by applying, by the memory controller 210, a refresh command to the memory 250. The refresh operation may be performed on the memory banks BK0 to BK3 in parallel. Each of the row circuits 343_0 to 343_3 may refresh a row corresponding to a row address for refreshing, among the rows of each of the cell arrays 341_0 to 341_3. The row address for refreshing may be a row address that has been internally generated in the memory 250, not a row address that is transferred by the memory controller 210.

The refresh operation may include an operation of activating a row and precharging the activated row. While a row is activated, data of memory cells of the activated row may be detected and amplified (i.e., re-written).

Smart Refresh Operation

A smart refresh operation may mean an operation of refreshing a row that is regarded as in a danger of a data loss due to a row hammering attack. The smart refresh operation may be performed by the indication of the memory controller 210, or may be autonomously performed in the memory 250. When the memory controller 210 indicates a smart refresh operation to the memory 250, a circuit (for example, each of the row circuits 343_0 to 343_3) within the memory 250 may perform the smart refresh operation. Alternatively, although the indication of the memory controller 210 is not present, the circuit within the memory 250 may perform a smart refresh operation for the remaining time of a normal refresh operation.

After the start of a smart refresh operation, one or more of rows that have been classified by the row classification circuit 330 as the refresh-target rows that need to be refreshed may be refreshed. For example, if a 6$^{th}$ row and 8$^{th}$ row of the memory bank BK2 have been stored in the row classification circuit 330 as the refresh-target rows that need to be refreshed, the row circuit 343_2 may refresh one or more of the 6$^{th}$ row and the 8$^{th}$ row. A row on which a smart refresh operation has been performed may be deleted from the row classification circuit 330.

Figure 4:
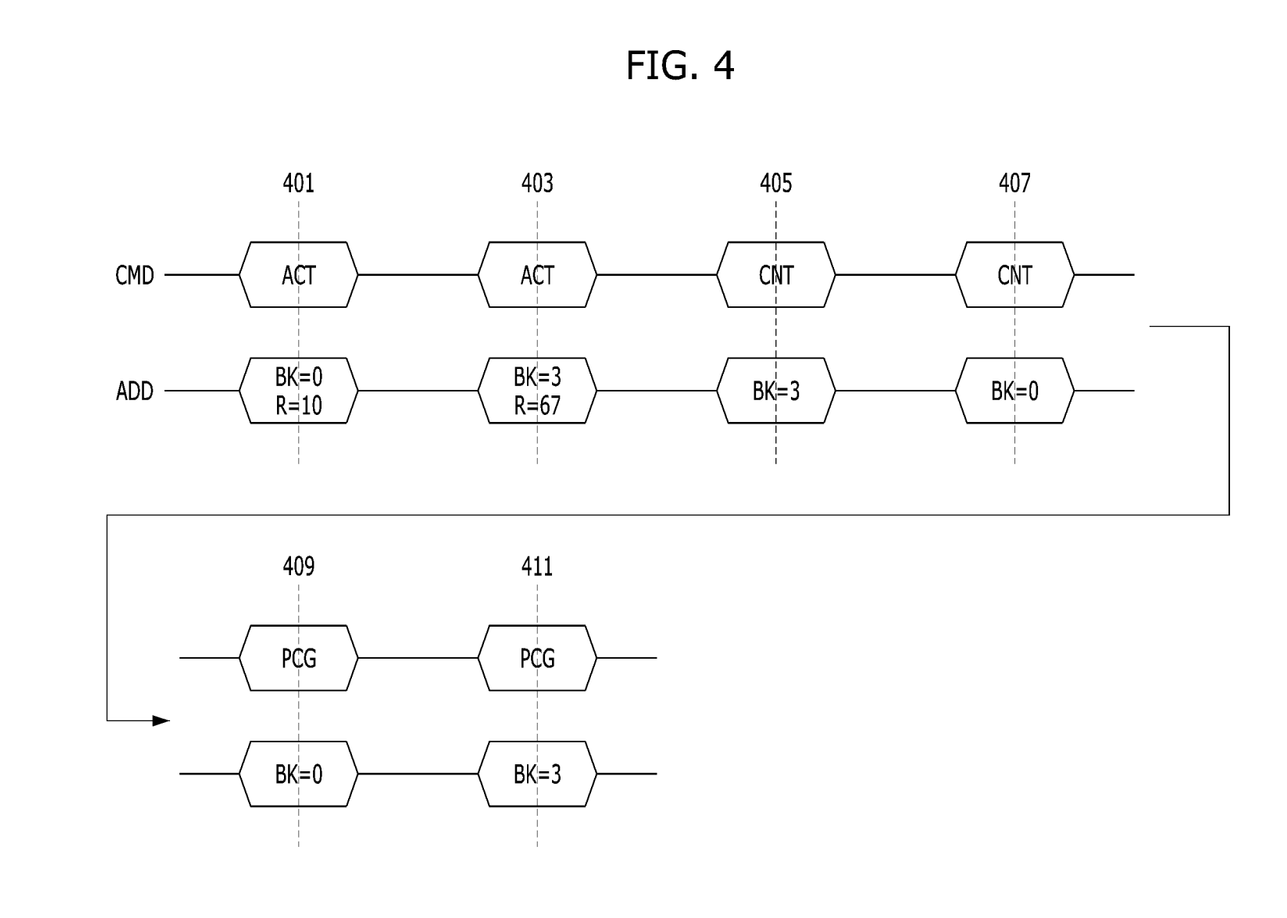
FIG. 4 is a timing diagram for describing an operation when a (normal) counting command is applied to the memory shown in FIG. 3.

FIG. 4 is a timing diagram for describing an operation when a normal counting command is applied to the memory 250 shown in FIG. 3. "CMD" may be a command in the command and address CA that is applied to the memory 250 and "ADD" may be an address in the command and address CA.

Referring to FIG. 4, at timing 401, an active command ACT, a bank address (BK=0) for selecting the memory bank BK0, and a row address (R=10) for selecting a 10$^{th}$ row of the memory bank BK0 may be applied to the memory 250. Accordingly, the 10$^{th}$ row of the memory bank BK0 may be activated. At timing 403, the active command ACT and a bank address (BK=3) for selecting the memory bank BK3, and a row address (R=67) for selecting a 67$^{th}$ row of the memory bank BK3 may be applied to the memory 250. Accordingly, the 67$^{th}$ row of the memory bank BK3 may be activated.

At timing 405, a normal counting command CNT and a bank address (BK=3) for selecting the memory bank BK3 may be applied to the memory 250. Accordingly, a normal counting operation for updating the access count of the 67$^{th}$ row of the memory bank BK3 may be performed on the memory bank BK3.

At timing 407, the normal counting command CNT and a bank address (BK=0) for selecting the memory bank BK0 may be applied to the memory 250. Accordingly, a normal counting operation for updating the access count of the 10$^{th}$ row of the memory bank BK0 may be performed on the memory bank BK0.

At timing 409, a precharge command PCG and the bank address (BK=0) may be applied to the memory 250, so that the memory bank BK0 may be precharged. At timing 411, the precharge command PCG and the bank address (BK=3) may be applied to the memory 250, so that the memory bank BK3 may be precharged.

Figure 5:
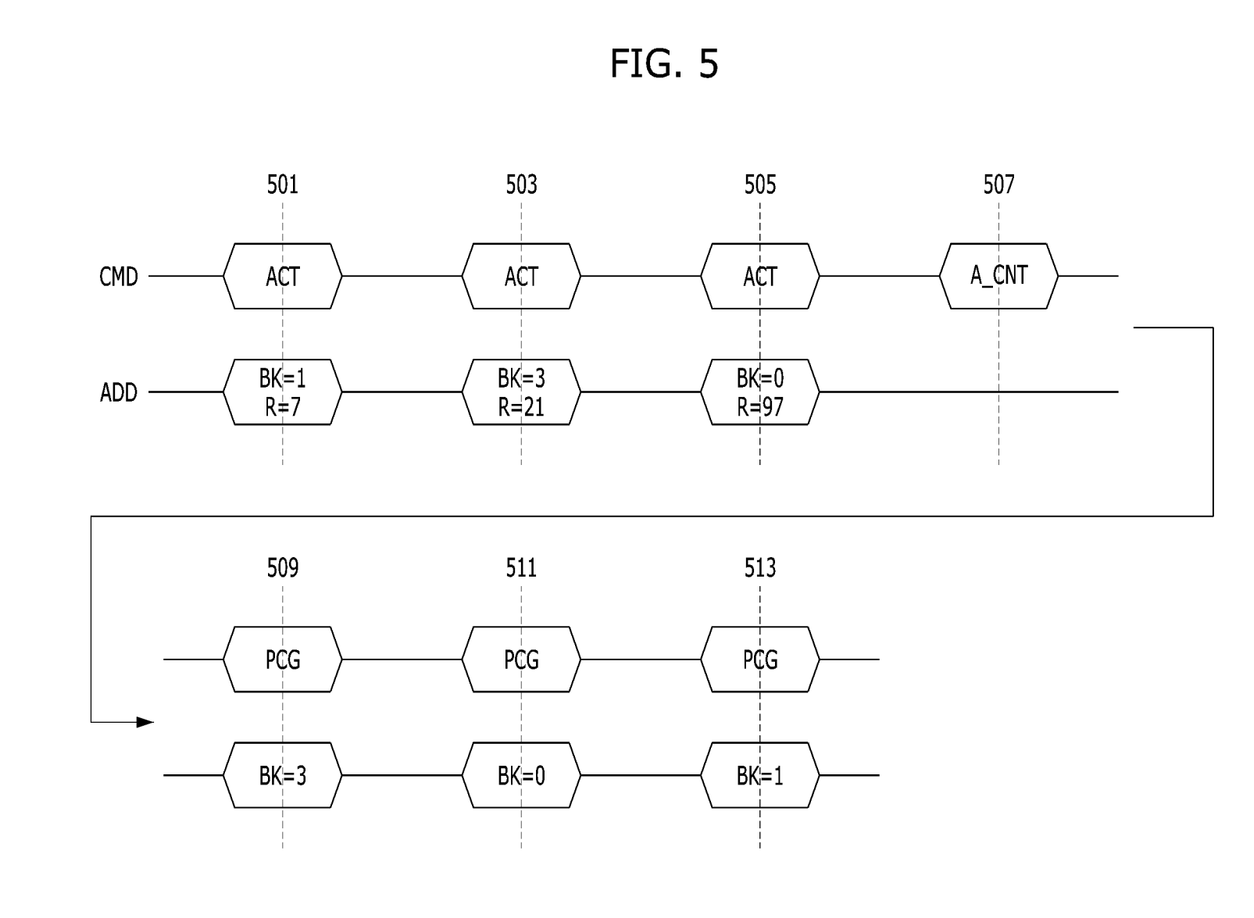
FIG. 5 is a timing diagram for describing an operation when an all-bank counting command is applied to the memory shown in FIG. 3.

FIG. 5 is a timing diagram for describing an operation when an all-bank counting command is applied to the memory 250 shown in FIG. 3.

Referring to FIG. 5, at timing 501, the active command ACT, a bank address (BK=1) for selecting the memory bank BK1, and a row address (R=7) for selecting the 7$^{th}$ row of the memory bank BK1 may be applied to the memory 250. Accordingly, the 7$^{th}$ row of the memory bank BK1 may be activated. At timing 503, the active command ACT, a bank address (BK=3) for selecting the memory bank BK3, and a row address (R=21) for selecting a 21$^{st}$ row of the memory bank BK3 may be applied to the memory 250. Accordingly, the 21$^{st}$ row of the memory bank BK3 may be activated. At timing 505, the active command ACT, a bank address (BK=0) for selecting the memory bank BK0, and a row address (R=97) for selecting a 97$^{th}$ row of the memory bank BK0 may be applied to the memory 250. Accordingly, the 97$^{th}$ row of the memory bank BK0 may be activated.

At timing 507, an all-bank counting command A_CNT may be applied to the memory 250. Since the memory banks BK0, BK1, and BK3 of the memory 250 have been in an activation state, an all-bank counting operation may be performed on the memory banks BK0, BK1, and BK3 in response to the all-bank counting command A_CNT. The access count of the 97$^{th}$ row of the memory bank BK0 may be updated by being increased by +1. The access count of the 7$^{th}$ row of the memory bank BK1 may be updated by being increased by +1. The access count of the 21$^{st}$ row of the memory bank BK3 may be updated by being increased by +1. The all-bank counting command A_CNT may be a command for enabling a counting operation to be performed on all activated memory banks. Accordingly, when the all-bank counting command A_CNT is applied, the bank addresses of all of the activated memory banks might not need to be applied to the memory 250.

At timing 509, a precharge command PCG and a bank address (BK=3) for selecting the memory bank BK3 may be applied to the memory 250, so that the memory bank BK3 may be precharged. At timing 511, the precharge command PCG and a bank address (BK=0) for selecting the memory bank BK0 may be applied to the memory 250, so that the memory bank BK0 may be precharged. At timing 513, the precharge command PCG and a bank address (BK=1) for selecting the memory bank BK1 may be applied to the memory 250, so that the memory bank BK1 may be precharged.

Since the all-bank counting command is used, the memory controller 210 may less frequently apply a normal counting command to the memory 250. For example, in the case of FIG. 5, if a normal counting command is used without using an all-bank counting command, the normal counting command needs to be applied three times. Accordingly, the use of the all-bank counting command can improve efficiency of the memory system 200.

Figure 6:
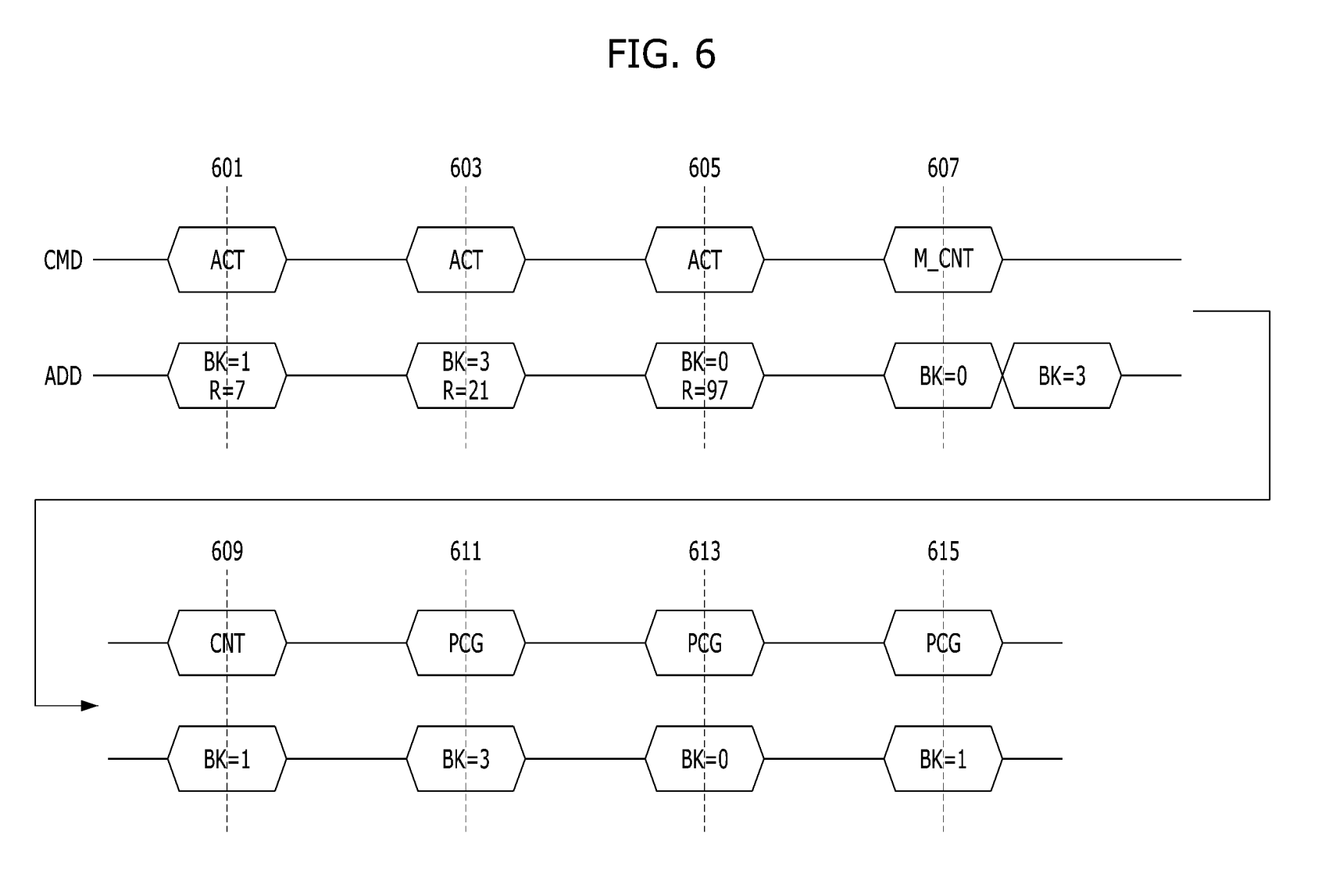
FIG. 6 is a timing diagram for describing an operation when a multi-bank counting command is applied to the memory shown in FIG. 3.

FIG. 6 is a timing diagram for describing an operation when a multi-bank counting command is applied to the memory 250 shown in FIG. 3.

Referring to FIG. 6, at timing 601, the active command ACT, a bank address (BK=1) for selecting the memory bank BK1, and a row address (R=7) for selecting the 7$^{th}$ row of the memory bank BK1 may be applied to the memory 250. Accordingly, the 7$^{th}$ row of the memory bank BK1 may be activated. At timing 603, the active command ACT, a bank address (BK=3) for selecting the memory bank BK3, and a row address (R=21) for selecting a 21$^{st}$ row of the memory bank BK1 may be applied to the memory 250. Accordingly, the 21$^{st}$ row of the memory bank BK3 may be activated. At timing 605, the active command ACT, a bank address (BK=0) for selecting the memory bank BK0, and a row address (R=97) for selecting the 97$^{th}$ row of the memory bank BK0 may be applied to the memory 250. Accordingly, the 97$^{th}$ row of the memory bank BK0 may be activated.

At timing 607, a multi-bank counting command M_CNT may be applied to the memory 250, and a bank address (BK=0) for selecting the memory bank BK0 and a bank address (BK=3) for selecting the memory bank BK3 may be continuously applied to the memory 250. That is, a multi-bank counting operation for the memory bank BK0 and the memory bank BK3 may be indicated by the multi-bank counting command M_CNT. The access count of the 97$^{th}$ row of the memory bank BK0 may be updated by being increased by +1. The access count of the 21$^{st}$ row of the memory bank BK3 may be updated by being increased by +1.

At timing 609, the normal counting command CNT and a bank address (BK=1) for selecting the memory bank BK1 may be applied to the memory 250. Accordingly, the access count of the 7$^{th}$ row of the memory bank BK1 may be updated by being increased by +1.

At timing 611, the precharge command PCG and a bank address (BK=3) for selecting the memory bank BK3 may be applied to the memory 250, so that the memory bank BK3 may be precharged. At timing 613, the precharge command PCG and a bank address (BK=0) for selecting the memory bank BK0 may be applied to the memory 250, so that the memory bank BK0 may be precharged. At timing 615, the precharge command PCG and a bank address (BK=1) for selecting the memory bank BK1 may be applied to the memory 250, so that the memory bank BK1 may be precharged.

Since the multi-bank counting command is used, the memory controller 210 can designate multiple memory banks in the memory 250 so that a counting operation can be performed.

Although embodiments according to the technical spirit of the present disclosure have been described above with reference to the accompanying drawings, the embodiments have been provided to merely describe embodiments according to the concept of the present disclosure, and the present disclosure is not limited to the embodiments. A person having ordinary knowledge in the art to which the present disclosure pertains may substitute, modify, and change the embodiments in various ways without departing from the technical spirit of the present disclosure written in the following claims. Such substitutions, modifications, and changes may be said to belong to the scope of the present disclosure. Furthermore, the embodiments May be combined to form additional embodiments.

What is claimed is:

1. An operation method of a memory, the operation method comprising:
    activating a first row that is selected in a first bank;
    activating a second row that is selected in a second bank;
    receiving an all-bank counting command;
    reading a first access count from memory cells of specific columns of the first row in response to the all-bank counting command;
    increasing the first access count;
    writing the increased first access count in the memory cells of the specific columns of the first row;
    reading a second access count from memory cells of specific columns of the second row in response to the all-bank counting command;
    increasing the second access count; and
    writing the increased second access count in the memory cells of the specific columns of the second row.

2. The operation method of claim 1, further comprising:
    precharging the first bank and the second bank;
    activating a third row that is selected in the first bank;
    activating a fourth row that is selected in the second bank;
    activating a fifth row that is selected in a third bank;
    receiving a multi-bank counting command, a bank address for selecting the first bank, and a bank address for selecting the third bank;
    reading a third access count from memory cells of specific columns of the third row, in response to the multi-bank counting command and the bank address for selecting the first bank;

increasing the third access count;
writing the increased third access count in the memory cells of the specific columns of the third row;
reading a fourth access count from memory cells of specific columns of the fifth row, in response to the multi-bank counting command and the bank address for selecting the third bank;
increasing the fourth access count; and
writing the increased fourth access count in the memory cells of the specific columns of the fifth row.

3. The operation method of claim 2, further comprising:
receiving a normal counting command and a bank address for selecting the second bank;
reading a fifth access count from memory cells of specific columns of the fourth row, in response to the normal counting command and the bank address for selecting the second bank;
increasing the fifth access count; and
writing the increased fifth access count in the memory cells of the specific columns of the fourth row.

4. The operation method of claim 1, further comprising:
checking that the increased first access count is equal to or greater than a threshold; and
classifying rows adjacent to the first row as rows that need to be refreshed in response to the checking.

5. The operation method of claim 1, wherein the memory cells of the specific columns of the first row and the memory cells of the specific columns of the second row are configured not to store therein data other than the first and second access counts.

6. The operation method of claim 1, wherein the reading of the first access count, the increasing of the first access count, and the writing of the increased first access count are performed simultaneously with the reading of the second access count, the increasing of the second access count, and the writing of the increased second access count.

7. An operation method of a memory, the operation method comprising:
activating a first row that is selected in a first bank;
activating a second row that is selected in a second bank;
activating a third row that is selected in a third bank;
receiving a multi-bank counting command, a bank address for selecting the second bank, and a bank address for selecting the third bank;
reading a first access count from memory cells of specific columns of the second row, in response to the multi-bank counting command and the bank address for selecting the second bank;
increasing the first access count;
writing the increased first access count in the memory cells of the specific columns of the second row;
reading a second access count from memory cells of specific columns of the third row, in response to the multi-bank counting command and the bank address for selecting the third bank;
increasing the second access count; and
writing the increased second access count in the memory cells of the specific columns of the third row.

8. A memory comprising:
multiple memory banks each comprising memory cells that are arranged in multiple rows and multiple columns; and
access operation circuits provided in the respective memory banks, and each configured to update, in response to an all-bank counting command directed to activated memory banks among the multiple memory banks, an access count for an activated row of a corresponding memory bank.

9. The memory of claim 8, wherein each of the access operation circuits updates the access count by:
receiving the access count that is read from memory cells of specific columns of the activated row of the corresponding memory bank,
increase the received access count, and
transfer the increased access count to the corresponding memory bank.

10. The memory of claim 9, further comprising a row classification circuit configured to classify, as refresh-target rows that need to be refreshed within each of the memory banks, adjacent rows of a row storing therein the access count that is equal to or greater than a threshold.

11. The memory of claim 10, further comprising a circuit configured to perform a smart refresh operation on at least one of the refresh-target rows.

12. The memory of claim 8, wherein specific columns of the multiple columns are configured to store an access count for each of the multiple rows within each of the multiple memory banks.

13. The memory of claim 8,
wherein each of the access operation circuits is further configured to update, in response to a multi-bank counting command directed to two or more selected from the multiple memory banks, the access count for the activated row of the corresponding memory bank that is one of the selected memory banks.

14. The memory of claim 8, wherein each of the access operation circuits is further configured to update, in response to a normal counting command directed to the corresponding memory bank, the access count for the activated row of the corresponding memory bank.

15. A memory comprising:
multiple memory banks each comprising memory cells that are arranged in multiple rows and multiple columns; and
access operation circuits provided in the respective memory banks, and each configured to update, in response to a multi-bank counting command directed to two or more memory banks selected from the multiple memory banks, an access count for an activated row of a corresponding bank of the selected memory banks.

16. The memory of claim 15, wherein the selected two or more memory banks are selected by a memory controller.

17. A memory system comprising:
a memory controller configured to indicate an active operation and an all-bank counting operation; and
a memory comprising multiple memory banks that are activated by the indication of the active operation and configured to perform, in response to the indication of the all-bank counting operation directed to activated memory banks among the multiple memory banks, an operation of updating an access count of an activated row of each of the activated memory banks.

18. The memory system of claim 17, wherein:
the memory controller is configured to further indicate a multi-bank counting operation, and
the memory is further configured to perform, in response to the indication of the multi-bank counting operation directed to two or more memory banks selected from the multiple memory banks, an operation of updating the access count of the activated row of each of the selected memory banks.

19. The memory system of claim 17, wherein:

the memory controller is configured to further indicate a normal counting operation, and the memory is further configured to perform, in response to the indication of the normal counting operation directed to a selected memory bank of the multiple memory banks, an operation of updating the access count of the activated row of the selected memory bank.

20. A memory system comprising:

a memory controller configured to indicate an active operation and a multi-bank counting operation; and a memory comprising multiple memory banks that are activated by the indication of the active operation and configured to perform, in response to the indication of the multi-bank counting command directed to two or more memory banks selected from the multiple memory banks, an operation of updating an access count of an activated row of each of the selected memory banks.

* * * * *